No. 648,230. Patented Apr. 24, 1900.
J. A. BOWDEN.
FILTER.
(Application filed Jan. 8, 1900.)
(No Model.)
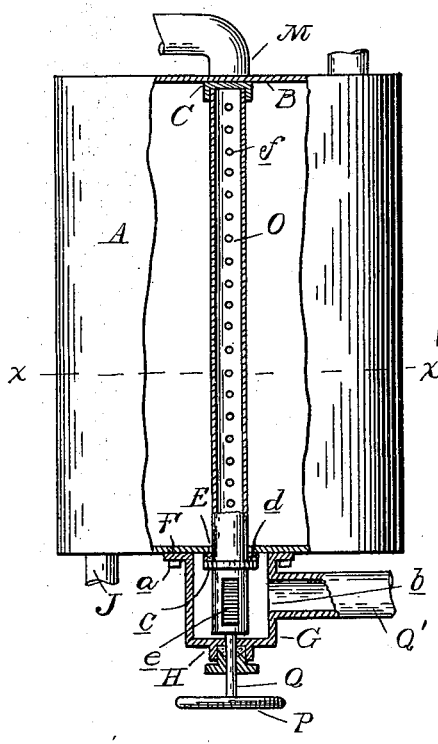
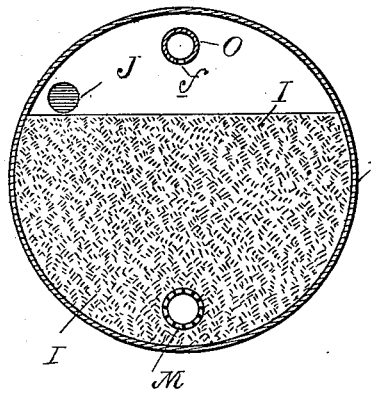
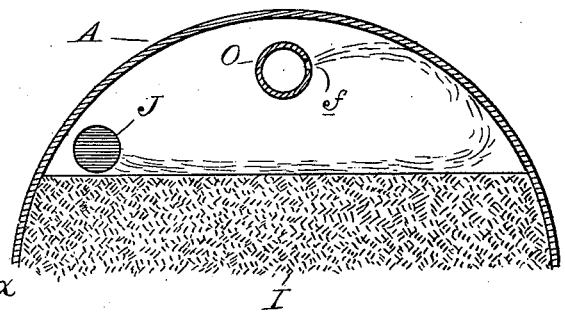
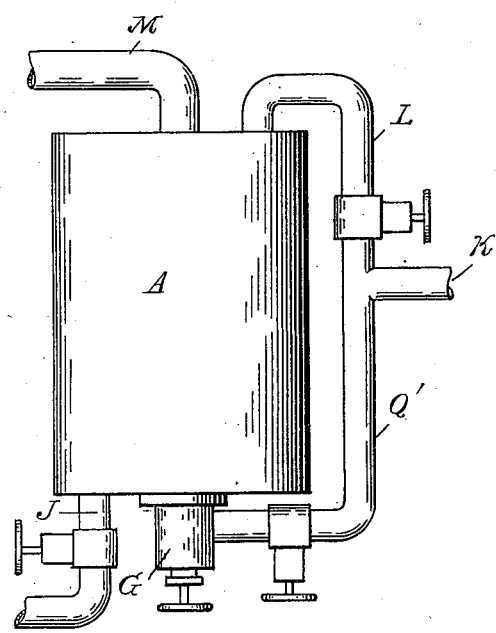
Witnesses
H. C. Smith
M. B. Dogherty
Inventor
Junius A. Bowden
By Tho. H. Maguet &Co
Attys.
THE NORRIS PETERS CO., PHOTO-LITHO., WASHINGTON, D. C.

UNITED STATES PATENT OFFICE.

JUNIUS A. BOWDEN, OF DETROIT, MICHIGAN, ASSIGNOR TO THE HYGEIA FILTER COMPANY, OF SAME PLACE.

FILTER.

SPECIFICATION forming part of Letters Patent No. 648,230, dated April 24, 1900.

Application filed January 8, 1900. Serial No. 684. (No model.)

*To all whom it may concern:*

Be it known that I, JUNIUS A. BOWDEN, a citizen of the United States, residing at Detroit, in the county of Wayne and State of Michigan, have invented certain new and useful Improvements in Filters, of which the following is a specification, reference being had therein to the accompanying drawings.

The invention relates to filters particularly designed for use in filtering water that is to be supplied to towns and cities, the filter comprising the usual filter-bed and the casing inclosing the same; and the invention consists in the novel means employed for cleansing the bed and the casing, as will be more fully hereinafter set forth.

The invention further consists in the peculiar construction, arrangement, and combination of the various parts of the cleansing mechanism, as hereinafter described and shown in the drawings, in which—

Figure 1 is a plan view of a filter. Fig. 2 is a view similar to Fig. 1, broken away in parts to illustrate the construction and arrangement of the cleansing mechanism. Fig. 3 is a section on line $x$ $x$, Fig. 2; and Fig. 4 is a similar sectional view enlarged to illustrate the manner in which the cleaning of the filter is effected.

In the drawings thus referred to the letter A designates the inclosing casing, which is preferably cylindrical in configuration and adapted to rest upon its cylindrical surface, as shown. Within the casing and secured to the head B thereof is a bearing C, and E is an aperture formed within the opposite casing-head F, diametrically opposite the bearing.

G designates an inclosing casing secured to the head F and surrounding the aperture E, formed in said head, the casing being held in place in any suitable manner, as by bolts $a$. This casing in turn is provided with a stuffing-box H and the water-inlet port $b$, as plainly shown in Fig. 2.

I designates the filter-bed of granular material arranged in the casing A, and J designates a valve-controlled drain-pipe communicating with the interior of the casing through the head F at the level of the filter-bed. The water that is to be filtered is supplied to the casing through the water-supply pipe K, which is provided with a valve-controlled branch pipe L, communicating with the interior of the casing through the head B, as shown in Fig. 1.

M designates the discharge-pipe through which the water that is filtered is conducted away from the casing. This pipe extends in the usual manner within the filter below the bed, and the portion within the casing may be perforated, as shown in Fig. 3, or may be of any approved construction to permit of its receiving the purified water.

My improved cleansing mechanism is arranged within the interior of the casing some distance above the bed, and consists, essentially, of a flushing device and means for maintaining a water-supply to the said device in the manner hereinafter described.

The flushing mechanism consists, essentially, of a perforated pipe O, extending longitudinally throughout the length of the inclosing casing, having one end journaled in the bearing C in the head B and the opposite end extending through the aperture E and within the casing G. The bearing thus described permits of the pipe being rotated in a vertical plane, and any means may be employed for actuating the pipe—such, for instance, as the hand-wheel P and the stem or shaft Q, which extends through the stuffing-box H and is connected in any suitable manner to the free end of the pipe O.

$c$ designates a collar formed upon the portion of the pipe within the casing G, and $d$ designates a packing interposed between said collar and the cylindrical casing-head F. The perforated pipe is likewise provided with a multiple of openings or slots, such as $e$, whereby the water that is conveyed to the chamber G may enter the pipe and be discharged through the longitudinal series of apertures $f$ therein.

Q' designates a valve-controlled branch water-supply pipe leading from the pipe K to the casing G and communicating with the latter through the inlet-port $b$.

The construction of the mechanism being thus described, the operation is as follows: Water is supplied continuously from the source of water-supply to the filter through the branch pipe L, the drain-pipe J and the branch pipe Q' being closed during the operation of filtering. When it is desired to cleanse the apparatus, the supply of water through the pipe L is shut off, the drain-pipe opened, and the valve within the branch pipe Q' turned to permit of water being supplied to the flushing mechanism. The operator by turning the hand-wheel P is enabled to discharge water against any portion of the interior of the inclosed casing above the filter-bed to flush the same and also against the surface of the filter-bed, the impurities being drained off through the drain-pipe J. After the cleansing has been effected the various valves are opened and closed in the proper manner to permit of the water being filtered.

It will be obvious from the construction of the cleansing mechanism that the flushing is effected by discharging the water progressively over the surface that is to be cleansed, and also that the water may be discharged in the direction of the drain, whereby all the impurities are swept off of the interior of the casing and also from the surface of the bed.

What I claim as my invention is—

1. In a filter, the combination with an inclosing casing, of a filter-bed therein, means for progressively flushing the inner surface of the casing above the bed, and means for draining off the water from the surface of the bed.

2. In a filter, the combination with the inclosing casing, of a filter-bed therein, a drain-conduit leading from the casing at the level of the filter-bed, and means for progressively flushing the surface of the bed and inner surface of the casing above the bed.

3. In a filter, the combination with an inclosing casing, of a filter-bed therein, a movable flushing device arranged within the casing above the bed, a water-supply therefor, means for moving said flushing device to change the direction of the stream, and means for draining the water from the bed.

4. In a filter, the combination with the inclosing casing, of a filter-bed therein, a valve-controlled drain-conduit leading from the casing, a flushing device rotatably mounted within the casing above the bed, means for supplying water thereto, and means for actuating the flushing devices.

5. In a filter, the combination with the inclosing casing, of a filter-bed therein, a valve-controlled drain-conduit leading from the casing at the level of the filter-bed, a flushing device rotatably mounted within the casing above the bed, means for supplying water thereto, and means for rotating said flushing device to progressively flush the casing and bed-surface.

6. In a filter, the combination with an inclosing casing, of a filter-bed therein, a valve-controlled drain-conduit leading from the casing at the level of the filter-bed, a perforated pipe extending longitudinally within the casing and mounted therein above the bed for rotary movement in a vertical plane, means for rotating said pipe, a valve-controlled water-supply pipe, and a water-supply connection between said supply-pipe and the perforated pipe, substantially as and for the purpose described.

In testimony whereof I affix my signature in presence of two witnesses.

JUNIUS A. BOWDEN.

Witnesses:
L. J. WHITTEMORE,
H. C. SMITH.